United States Patent [19]

Tanaka et al.

[11] Patent Number: 5,841,659
[45] Date of Patent: Nov. 24, 1998

[54] PRODUCTION PLAN GENERATING METHOD AND APPARATUS

[75] Inventors: Masayuki Tanaka, Yawata; Toru Nakamura, Osaka; Hirokazu Kominami, Kakogawa; Yoshihisa Kuromiya, Higashiosaka; Itsuhiro Yamada, Hirakata, all of Japan

[73] Assignee: Matsushita Electric Industrial Co., Ltd., Osaka, Japan

[21] Appl. No.: 868,537

[22] Filed: Jun. 4, 1997

Related U.S. Application Data

[63] Continuation of Ser. No. 643,405, May 6, 1996, abandoned, which is a continuation of Ser. No. 250,684, May 26, 1994, abandoned.

[51] Int. Cl.$^6$ .................................................. G06F 19/00
[52] U.S. Cl. ............................................................. 364/468
[58] Field of Search ............................................. 364/468

[56] References Cited

U.S. PATENT DOCUMENTS

| | | | |
|---|---|---|---|
| 4,807,108 | 2/1989 | Ben-Arieh et al. | 364/148 |
| 4,887,218 | 12/1989 | Natarajam | 364/468 |
| 5,233,533 | 8/1993 | Edstrom et al. | 364/468 |
| 5,241,465 | 8/1993 | Oba et al. | 364/401 |
| 5,249,120 | 9/1993 | Foly | 364/401 |
| 5,255,181 | 10/1993 | Chapman et al. | 364/468 X |
| 5,321,692 | 6/1994 | Tanaka et al. | 364/468 |

FOREIGN PATENT DOCUMENTS

| | | |
|---|---|---|
| 0488246 | 6/1992 | European Pat. Off. . |
| 62-52666 | 3/1992 | Japan . |
| 2248704 | 4/1992 | United Kingdom . |
| 2248705 | 4/1992 | United Kingdom . |

OTHER PUBLICATIONS

Tsukiyama, M et al.; "Advanced Hybrid Scheduling System for Manufacturing"; Industrial Eletronics, Control and Instrumentation Conference; 1991.

Carvalho, L. et al.; "An Integrated Envrioment for Planning And Scheduling In Flow–Shop Manufacuring Plants"; Computer Integrated Manufacturing, 1990.

United Kingdom Search Report.

*Primary Examiner*—Reba I. Elmore
*Assistant Examiner*—Sheela S. Rao
*Attorney, Agent, or Firm*—Greenblum & Bernstein, P.L.C.

[57] ABSTRACT

A production plan generating apparatus, and a method, are provided for generating production plans in sequential chronological order, from an ultimate downstream process in which a final product is produced, to all of the upstream processes required to produce components needed to make the final product. The apparatus includes an input device for inputting initial data including ultimate downstream process data, and a memory for storing the input data, machine data and process data, and a generator for generating a production plan for the final product, and upstream plans for the components and/or sub-components which are required in order to produce the final product. The generator uses the ultimate downstream process data to generate intermediate downstream process data relating to the production process that occurs just before the ultimate downstream process is effected, and sequentially generates data relating to further upstream processes in a sequential order, using data from an immediately prior upstream process plan.

26 Claims, 10 Drawing Sheets

PRODUCTION PLAN GENERATING METHOD AND APPARATUS

This application is a continuation of application Ser. No. 08/643,405, filed May 6, 1996, now abandoned, which is a continuation of application Ser. No. 08/250,684, filed May 26, 1994, abandoned.

BACKGROUND OF THE INVENTION

I. Field of the Invention

The present invention generally relates to a production plan generating method and to a related apparatus for generating production plans in accordance with the method, and more particularly relates to a dynamic scheduler which is adapted for coordinating the production of one or more assembly lines making different finished products, each assembly line including a plurality of production steps.

II. Description of Background Material

As a result of advances in technology and rapidly changing consumption patterns, manufacturers must presently contend with a rapidly changing manufacturing environment which is often characterized by the manufacture of a wide range of goods in relatively small production lots, with such goods having shorter delivery schedules and shorter product life cycles than has previously been the case. The ability to respond quickly and sensitively to market changes is now extremely important in such a multi-product, small-lot manufacturing environment, and requires the ability to generate precise plans for factories which produce goods having multiple production processes or steps and/or which include several product lines, the ability to rapidly change these plans, and the ability to efficiently produce an appropriate number of components and finished products without unnecessary expenditure of material, time or cost.

A number of attempts have been made to facilitate and/or computerize production processes for the manufacture of various products.

One known production plan generator is illustrated in FIG. 6, which schematically illustrates a system which was disclosed, e.g., in Japanese Published Patent Application 62-52,666. In this known generator, a central processing unit (i.e., CPU) 101, typically a computer, is used to generate a production plan in accordance with a provided production plan generating program 100. A memory 102 for storing basic data relating to the production equipment to be used, and other parameters, is connected to enable access to such data by the CPU 101. An additional memory 103 is used as working memory by the CPU, such that the CPU can therefore generate a production plan based upon the stored data.

Known data that is essential to each of the processes to be scheduled by this system can be entered through an input device 104, e.g., a keyboard, connected to CPU 101. A "plan results" memory 106 is provided for storing the production plan generated by the production plan generating program in the CPU, a display device 107 is provided for displaying the plan results, and a printer 108 is provided for printing the plan results, with the printer also being connected to CPU 101.

In this prior art system, the noted production plan generation process is executed separately for each step in the production process, based upon the basic data which is input via input device 104, and upon data which is provided in working memory 103. Because the product plan generation process is executed separately for each production process step, when one or more processes or steps are interrelated, the personnel operating the planner for an "upstream process" (i.e., a process which is performed earlier during production of a final product) must cross reference or otherwise relate the proposed production plan for such an upstream process step with the proposed production plan for a downstream process step (i.e., a sequentially later process which is required to be performed in order to produce a finished product). It is necessary to do so in order that the personnel can identify any factors present in the "downstream process" that depend upon certain conditions, requirements, or factors relating to the "upstream process" (e.g., the volume of product required by the downstream process), and to thereafter input any such conditions as feedback to the production plan generator for the upstream process. The generator must then run again in order to generate a production plan for the upstream process that is compatible with the requirements of the downstream process. In other words, the operator of the system which is designed to produce a production plan generating program for an upstream process cannot operate in ignorance of the later, downstream processes which are required in an overall production plan, and in fact requires information from the later in time (during production of a given final product) downstream processes in order to be able to properly plan a given upstream process. As an example, an operator would have to know the volume of product which is going to be produced at a downstream process step, and the date by which they need to be produced, and the time when they are produced, in order to accurately execute a final production plan for an upstream process.

In many factories, however, goods are manufactured through a series of plural production process steps. Thus, while the system described in FIG. 6 constitutes a conventional planning process which optimizes the production plans of individual processes or steps used to produce final products, it involves developing production plans dependent upon each specific process, or a number of processes, or developing separate production plans for each process; and such a system does not interrelate all of the processes or steps, and therefore cannot optimize the production plan for an overall production process which involves a series of steps, processes and/or components to produce a final product. In order to overcome such a deficiency, personnel working with an upstream process must necessarily identify the needs-production data (e.g., final parameters representing the quantities of specific products which are required to be produced in subsequent steps) of a later, downstream process or step (e.g., the final downstream process or an intermediate downstream process), and thereafter determine any conditions that must be satisfied by the upstream process which the personnel is involved with as a result of the later implementation of any such downstream steps. Thereafter, the needs-production data must be entered into the upstream production plan, and such production plan must be adjusted. As a result, significant time, input and effort from a relatively large number of personnel will be required to generate an overall production plan using a system in which individual processes are separately being planned. Even further, from a practical standpoint, it is extremely difficult to completely coordinate production plans for chronologically sequential processes or steps in an overall production process (some of which may, e.g., be located apart from each other), and the tendency in such circumstances is to coordinate such plans only in a very superficial or basic fashion.

As an example of such difficulty, one should consider an upstream process which itself consists of a plurality of parallel (in time) component manufacturing processes, and a downstream process in which the components which are manufactured during the upstream process are then used to assemble the final products resulting from the components manufactured during the various upstream processes.

In such an example, the assembly process, i.e., the downstream process in this example, typically is programmed to begin only when all of the components from the various upstream processes are available and on hand to be assembled.

In such circumstances, the production start time of the downstream process must be set to start after providing a sufficient time for any delays which may occur during any of the upstream processes, and as a result significant and unnecessary time lags can occur during the production of final products. In other words, providing sufficient time or allowance, between processing steps, for the possible occurrence of such errors, can result in unnecessary waste of time in the overall production process.

The type and volume of products to be produced, and the volume(s) of products and components which can be produced in manufacturing production lots, will differ in each process. Typical lot size restrictions (i.e., the volume of production of one operational run of a given line) represent another factor which may delay the assembly of a final product or component from a plurality of components or sub-components, respectively, i.e., waiting for the completion of one generally parallel process may delay the next step even though other components have been prepared, particularly if the lot size (i.e., a practical limitation on manufacturing speed and volume) has not been taken into account. Such delays can accumulate during an overall production plan, such that there may well be an steady increase in the amount of time required to develop an optimal production plan as the number of production processes (each having its own manufacturing limitations) required to produce a finished product increases. BENARIEH, U.S. Pat. No. 4,807,108, discloses another production process for manufacturing, e.g., an electronic circuit pack.

Further, an inference planning system used for planning in a manufacturing system is disclosed in commonly assigned TANAKA et al., British Patent 2,219,109, and is also disclosed in its counterpart U.S. patent application Ser. No. 08/116,730, which issued as U.S. Pat. No. 5,231,620 on Jun. 14, 1994.

Both United Kingdom Patent No. 2,219,109 and U.S. Pat. No. 5,321,620 are expressly incorporated by reference herein in their entireties.

SUMMARY OF THE INVENTION

Accordingly, one object of the present invention is to provide a production plan generating method and a related apparatus for rapidly developing an optimal production plan for a plurality of interrelated production processes or steps, which takes the respective limitations of the processes, and the relationship between the steps, into account when generating an overall production plan for producing a final product.

In order to achieve this object, a production plan generating method is provided in accordance with the present invention which first generates a production plan for those process steps which are plannable based upon the receipt of basic data relating to, e.g., the production equipment to be used in such processes, process data which is specific to each process, and data relating to the goods to be produced. Thereafter, the method involves generation of a production plan for those processes which are plannable using previously generated production plan data and the above-noted three types of data. Thereafter, this latter planning step is repeatedly executed in order to generate production plans for the remaining steps of the process, while all the time accumulating the generated production plan data for each of the required process steps.

More particularly, when there are a plurality of chronologically sequential process steps in a production process, the production plans for the downstream processes, i.e., the processes which occur later during the production of a final product, are generated first. Thereafter, final parameters for the data relating to "needs," i.e., the product part number and/or type, and the quantity of such products which are to be produced during the upstream processes, and whether such upstream processes are to be divided or combined, are then generated; these final parameters are based upon the production plan data which has already been generated for the downstream processes, component configuration data for controlling the production or various parts and components at each step of the production process, process data for the upstream processes, and inventory data for the downstream processes. Production plans for each of the upstream processes are then sequentially generated (until a plan for the earliest in time step has been generated) in order to satisfy the "needs" data. In other words, plans are sequentially generated for all required products and components, in a chronological order which is opposite to the order in which the steps need to be performed to produce a final product.

In order to sequentially develop production plans for a plurality of processes, progressive control of plan generation is performed using the process data, process/process limitation data, and production plan completion data for each process. This makes it possible to search for and identify any processes for which a production plan has not yet been generated, and for those processes which will not be restricted by the limitations of other processes for which a production plan has not yet been generated, in order to be able to identify the next processes or steps for which production plans are to be generated.

In order to achieve these and other objects of the present invention, the production plan generator in accordance with the present invention comprises an input device for entering basic data relating to production equipment, process data specific to each of the plural processes or steps involved in the overall production process, and produced goods data, first memory means for storing the entered basic data, process data and produced goods data, and a first production plan generator for determining the processes for which a production plan can be generated based upon only the basic data, the process data, and the produced goods data stored in the first memory means. The generator also includes means for generating production plan(s) for the selected process(es) A second memory is provided for storing the production plan data which is generated and then output by the first production plan generator, and a second production plan generator is provided for determining the processes for which a production plan can next be generated based upon the basic data, the process data, produced goods data, and the previously generated production plan data which is stored in the second memory means. The second production plan generator generates production plan(s) for selected process(es) or steps, and stores the production plans which result in the second memory, and then repeats this sequence in order to generate production plans for all of the remaining processes which are required in order to produce a desired final product.

By using such a production plan generating method, production plans are first generated for those processes among the plural processes that can be scheduled based strictly upon known conditions, e.g., the basic data related to the production equipment to be used in the process, process data which is specific to each process, and produced goods data. Production plans are then generated for those processes which can be planned using the resulting "pre-generated production plan data", which is supplemented as needed by certain known condition data. The production plans which result from this last generation of plans are then accumulated as previously generated production plan data, and this process is repeated for all of the remaining steps or processes in the overall production process until production plans have been generated for all such processes which must be performed in the production process. As a result, production plans are generated in such an order that priority (in terms of the time when the plans are generated) is given to those processes for which production plans can be generated based only upon known conditions, and which are not dependent upon the chronological, spatial, or other relationship which exists between various production processes or steps (e.g., the ultimate or other downstream manufacturing step). In this way, the requirements that must be met for all of the remaining processes are gradually satisfied, and a coordinated plan is developed which will be appropriate for the overall production and for all of the process steps required.

Further, an optimal production plan which minimizes the time lag between chronologically sequential processes can be generated for manufacturing processes involving the assembly of a plurality of components, manufactured in plural upstream processes, into a single final product or part in a downstream process. Such an optimal plan will result if, when a plurality of chronologically sequential processes are used, the production plans for downstream processes are first generated, and thereafter "needs" data, which includes the product model number or type, and the quantity or volume of goods which need to be produced in the upstream processes, as well as whether such processes are to be divided or combined, is then generated. Such generation is based upon, e.g., the previously generated production plan data for the downstream processes, component configuration data relating to component part or type numbers in each step of the process, process data relating to the upstream processes, and inventory data relating to the downstream processes. This process thus serves to generate production plans for the upstream processes, which will satisfy the final parameters which are necessary to complete the production of the final product by the system in an efficient fashion.

Further, appropriate production plans for each process or step can be generated in accordance with known conditions at any given point in time, without error, and in an appropriate sequence, by monitoring the progress of production plan completion based upon process data, process step requirements data, and production plan completion data for each process; identifying those processes or steps for which production plans are still incomplete and whose plans are neither limited by nor dependent upon other processes for which production plans have not been generated, and thereafter defining these identified processes as the next processes for which production plans are to be generated during the sequential development of production plans for the plurality of processes or steps required to manufacture a given final product.

Thus, by using a production plan generator in accordance with the present invention, basic data relating to production equipment, process data which is specific to each of the plurality of processes or steps, and produced goods data are stored in a first memory as such data is entered via an input device. The processes for which a production plan can then be generated are thereafter determined by the first production plan generator, based only upon the data which is stored in a first memory area, then generated, and thereafter stored as pre-generated production plan data in a second memory area. A second production plan generator thereafter determines the processes for which production plans can then be generated, based upon data which is stored in the first memory and the pre-generated production plan data which is stored in the second memory, generates production plan(s) for the selected process(es), and then stores the resulting production plans in the second memory area. The second production plan generator repeats this sequence in order to generate production plans for all remaining processes for which production plans have not yet been generated. As a result, simply by inputting initially known data, production plans can be automatically generated, with plans first being produced for those process steps for which production plans can be generated based only upon known conditions, irrespective of the chronological, spatial or other relationship between production steps. This system thus gradually meets all of the requirements that must be satisfied for all of the remaining processes or steps, and is thereby develops an overall production plan which is appropriate for all of the processes needed to manufacture a final product.

A production plan generating apparatus is provided for generating a plurality of production plans, in sequential order to produce a product, for a downstream process in which said final product is to be produced, and for a plurality of upstream processes for producing components which are used in forming said final product from a plurality of components. The production plan generating apparatus comprises an input device for inputting initial data including data relating to said downstream process, a first memory area for storing said initial data, a first production plan generator for generating data relating to a first upstream process which needs to be performed, in order to produce said final product, before said downstream process is performed, said first production plan generator generating a production plan for said first upstream process, based upon at least some of said initial data, a second memory area for storing said plan generated by said first production plan generator, and a second production plan generator for generating a production plan for a second of said upstream processes, wherein the plan which is generated by said second production plan generator is based upon at least the plan stored in said second memory area, and wherein said second upstream process must be performed before said first upstream process is performed during manufacture of said final product.

The second production plan generator comprises means for sequentially generating a production plan for each of an additional plurality of upstream processes, wherein each successive plan generated by said second production plan generator is based at least partially upon the production plan generated for a sequentially previous upstream process. The initial data includes basic data relating to the equipment required to produce said final product and all of said components, and production data specific to each component and process which is required to produce said final product. The apparatus further comprises a parameter generator for generating a plurality of process parameters for use by said second production plan generator in generating production plans for said second and additional upstream processes.

The parameter generator comprises a system for generating preliminary parameters, said preliminary parameters comprising the types of specific components which must be produced in a sequentially previous upstream process, and the exact quantity of said specific components which will need to be produced in said sequentially later upstream process, and a system for generating final parameters which comprise the actual quantities of the specific components which must be produced during each of the second and additional upstream process.

The invention is also directed to a production plan generating method for generating production plans in a chronologically sequential order, for a downstream process in which a final product is to be produced, and for a plurality of upstream processes which are required to form said final product from a plurality of components. The production plan generating method comprises the steps of inputting initial data including ultimate downstream process data which relates to the final product to be produced, storing said input initial data, generating first upstream process data based upon the initial input data, said upstream process data relating to one of said upstream processes which precedes production of said final product, storing said first upstream process data, and generating additional upstream process data which relates to an additional upstream process which occurs during production of said final product, said additional upstream process data being based at least partially upon said first upstream process data, wherein said additional upstream process must be performed before said first upstream process is performed during production of said final product.

The method further comprises repeating step (e), based upon the most recently generated additional upstream process data, until no further Processes need to be performed in order to form said final product.

In another aspect, the present invention is directed to a system for generating an overall production plan for producing final products, wherein each of said final products is comprised of a plurality of components, said system being provided for generating a plan to determine the timing of a plurality of sequential process steps used to produce said final products, and the volume of final products and components which are to be produced. The system comprises a device for inputting data relating to the volume of each final product required to be produced, and the date by which said required volume of said final products are required to be produced, a memory for scoring a data tree for each final product to be produced, said data tree comprising information regarding the number and types of components which are required to produce each said final product, for storing the sequence in which said process steps must be performed in order to produce each said final product, and for storing data relating to the time required to perform each of said sequential process steps, and a production plan generator apparatus for generating separate production plans for producing said final product and performing each of said steps, said overall production plan including the sequence in which said steps are to be performed and the volume of components which must be produced during each step, as well as the date by which each step must be performed in order to produce said final product in the required volume and by the required date.

The device for inputting data comprises means for inputting data regarding a plurality of different final products. At least one of said plurality of final products has at least one component which is required to be used to manufacture said at least one final product in common with a second one of said plurality of different final products. Each of said final products is to be manufactured in accordance with a predetermined sequence, wherein said sequence involves a downstream process step in which the final product is assembled, and a plurality of sequential upstream steps in which the components which are required to manufacture said final product are assembled, wherein said production plan generator apparatus includes a first production plan generator and a second production plan generator, said first production plan generator comprising means for generating a plan for producing a final product in accordance with said downstream process step, based upon data input by said device for inputting data, and wherein said second production plan generator comprises means for generating a plan for performing each of said upstream process steps in accordance with at least some of the data input by said device for inputting data, and in accordance with data relating to an immediately preceding process step which is required to produce said final product.

The production plan generator apparatus includes a parameter generator, said parameter generator including means for generating a preliminary parameter and means for generating a final parameter, said means for generating a preliminary parameter including means for extracting data regarding an immediately preceding downstream process production plan, process data, and tree construction data relating to the components or the final product to be produced, from said memory, said final parameter generator comprising means for extracting inventory data and component lot size manufacturing data from said memory. Each of said production plan generators comprises means for generating a production plan for controlling a plurality of machines used in different process steps required to produce said final product.

Means are provided for controlling production of said final products in accordance with said overall production plan generated by said system. The system includes a printer for printing each production plan which is generated by said system, and a display device or displaying each production plan which is generated by said system; and the memory comprises a RAM. Means are also provided for controlling production of each final product in accordance with said overall production plan generated by said system.

A method is also provided for generating an overall production plan for producing final products each comprised of a plurality of components. The overall production plan governs the production of said components and said final products in a production process including a plurality of sequential process steps, said sequential process steps including a downstream production process step which produces said final products, and a plurality of upstream production process steps for producing said components. The method comprises inputting and storing basic data relating to said production process and production data regarding the volume of said final products which is required to be produced, and the date by which said required volume of final products is required to be produced, generating and storing a first production plan for producing said final products in said downstream production process step, said first production plan being based upon at least some of said basic data and said production data, generating and storing a second production is plan for a first upstream process step preceding said downstream process step, based upon at least some of said basic data, said production data and said first production plan, determining whether any additional upstream processes require planning, and if any additional upstream processes are identified as requiring planning, generating and storing a third production plan for an additional upstream process step which has not yet been planned and which must be performed before the first upstream stem is performed during manufacture of the final products, based upon at least some of said basic data, said production data, and the second production plan.

The method further comprises generating and storing overall production plans for a plurality of final products, wherein at least two of said final products to be produced have at least one component in common. The method further comprises printing said overall production plan, and displaying said production plan.

The method further comprises repeatedly determining whether any required upstream process still require planning, and then generating a production plan for the next sequential upstream process step to be performed in producing said final product, each time that any upstream process steps are determined to still require planning. Then, a final parameter relating to the volume and type of components which must be produced in the next process step to be planned is generated, prior to the generation of each of said upstream production plans.

The method further comprises producing said final parameter by extracting from a memory production plan data for the sequentially preceding plan, construction tree data relating to the component which must be next produced, and process specific data, generating a preliminary parameter, and modifying the preliminary parameter, in order to generate a final parameter after extracting inventory data and component lot size from memory. Then, the method involves controlling the production of each of said final products and each of said components in accordance with said overall production plan.

The present application is based upon Japanese Patent Application Serial No. 4-318,822, which was filed on Nov. 27, 1992, the entire content of which is expressly incorporated by reference herein.

BRIEF DESCRIPTION OF THE DRAWINGS

The above and other objects, features and advantages of the present invention will become more fully understood and apparent from the detailed description which follows, and as shown in the drawings attached hereto, in which like reference numerals are used throughout the several drawings to designate similar parts, and wherein:

FIG. 7b is a flow chart showing a modification of the flow chart shown in FIG. 7a;

DETAILED DESCRIPTION OF THE DRAWINGS

The system of the present invention is adapted to be used for manufacturing any type of product, particularly with respect to products involving a plurality of assembly lines or processing steps which must be coordinated. This process and assembly line control system are thus designed to coordinate the production of finished products from a plurality of parallel and/or sequential assembly lines or manufacturing different components which are used to make final products; and can be used either with a single assembly line or with a plurality of assembly lines. While the present invention is applicable to many types of products made in accordance with such processes, Applicants note, by way of non-limiting example, that the production planning process could be used, e.g., for generating an overall production assembly plan for producing printed circuit boards, televisions, or automobiles. With such products, it is possible that related products (e.g., a 25" television and a 20" television, two different automobile models manufactured by the same company, or printed circuit boards having a similar base but having different components) may include one or more component parts in common. The present invention is not only adapted to be used to generate a production plan for a single finished product, but is also well adapted for use in situations in which a company may be faced with the need to produce a number of different products at the same time, which products have one or more components in common.

In the case of a printed circuit board, e.g., the finished or downstream product may be the printed circuit board, with the components comprising, for example, a laminated base, one or more modules, and one or more electronic components. If the manufacturing process is directed to producing televisions, for example, the final products could be different size television sets, e.g., a 25" television and a 20" television, with common components including, e.g., certain circuit boards, and different components including, e.g., different LCD assemblies. As another non-limiting example herein, the final product could include different automobile models of a single automobile manufacturer, with the different components including doors and common components including radios, switches or door handles.

Thus, as can be seen from the above examples, the applicability of the present invention is quite wide in scope, and none of the examples which have been given herein is intended to limit the application of the invention. The application is thus broadly applicable to planning production for a variety of manufacturing processes, as can be used in the fashion set forth hereinafter.

Figure 1:
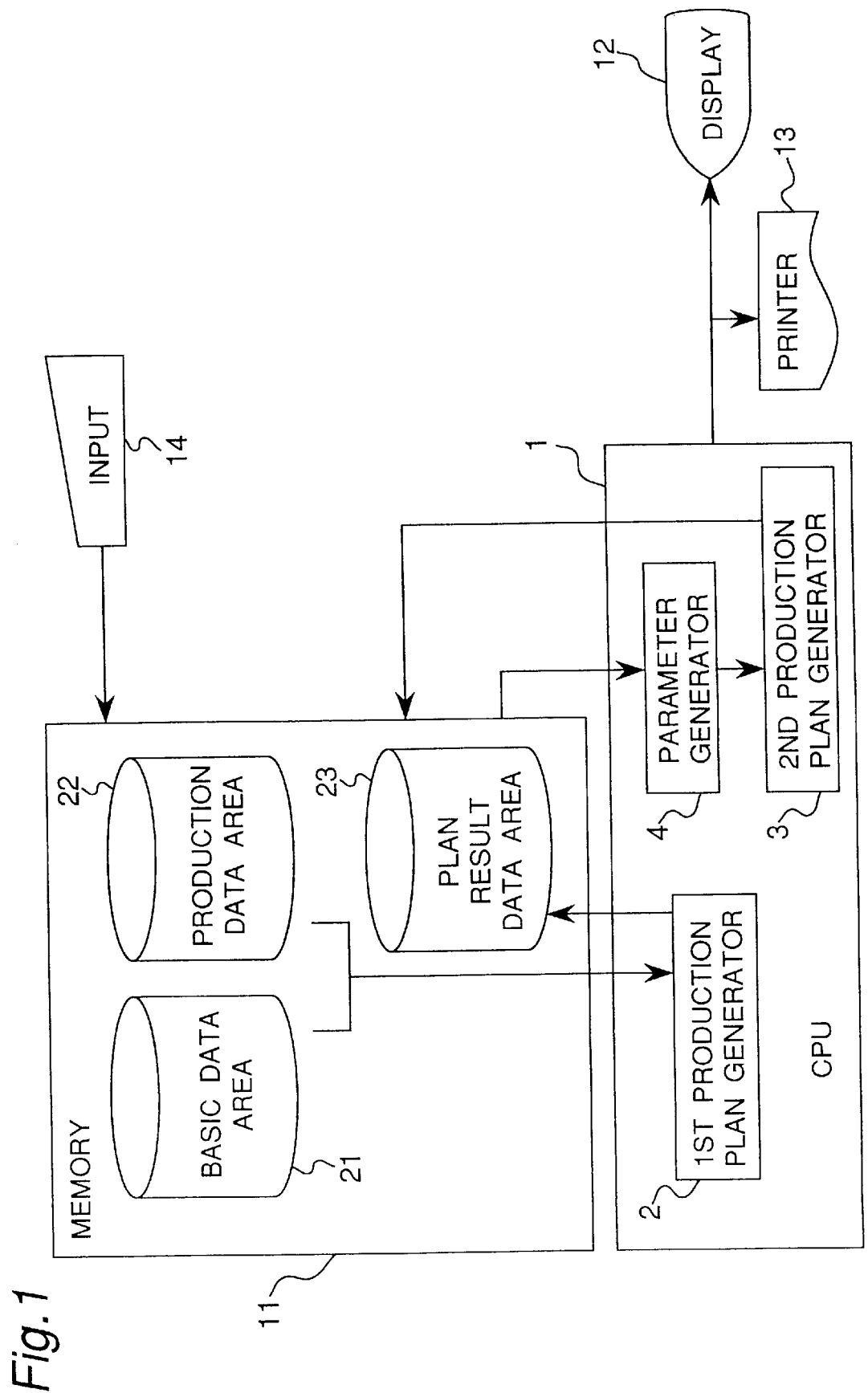
FIG. 1 is a schematic diagram of a production plan generating apparatus which is used to execute the production plan generating method of the present invention.

Referring now more specifically to the invention as described in FIG. 1, an illustrative embodiment of a production plan generating apparatus/assembly according to the present invention is illustrated. This apparatus includes an input device 14, e.g., a keyboard, for entering initial known data, and a memory 11 having a basic data storing area 21, a process specific production data storing area 22, and a plan result data storage area 23. The production plan generating apparatus further comprises a central processing unit (i.e., CPU) 1, a display device 12 and a printer 13, for respectively displaying and printing a generated production plan.

CPU 1 has a first production plan generator 2, a parameter generator 4 for generating a variety of parameters used in the production planning process, and a second production plan generator 3.

The first production plan generator 2 generates production plans for those processes that can be planned using only initially known data, e.g., basic data 21 and process specific production data 22. In other words, the first production plan generator 2 is provided for generating appropriate production plans as part of an overall, final production process, based upon parameters which are in turn based upon data received from the basic data storage area 21 and production data storage area 22. Thus, production plan generator 2 is provided for generating production plans which are not dependent upon the requirements of any other processes or steps, and which can be generated before receiving information relating to such processes or steps.

Second production plan generator 3 is provided for thereafter generating production plans for those processes that can only be properly planned using both the initially known data and production plan data which is previously generated by the first production plan generator 2. In other words, second production plan generator 3 is provided for generating appropriate production plans for production processes, other than the final (i.e., the downstream) actual production process, based upon parameters received from parameter generator 4. This second generator thus generates production plans for those upstream production processes or steps which are dependent upon the requirements and capabilities of later performed (i.e., downstream) production processes.

Memory 11 includes a plurality of information storage areas, and thus stores a variety of data, including initial known data which is input via input device 14, plan result data which is generated by the first production plan generator 2 and stored in data storage area 23, as well as plan result data which is generated by second production plan generator 3, and then stored in storage area 23.

Basic data storage area 21 stores data/information relating to production equipment used in the various processes in an overall manufacturing process for a given final product, such as the number of buildings which the factory includes, the number of assembly lines located in each building, and the number and type of machines in each line.

Production data stored at storage area 22 comprises, in this embodiment, process data which is specific to each process or step required to manufacture a final produce, as well as data relating to the goods which are being produced (the latter data being referred to hereinafter as "produced goods data"). More specifically, production data includes the number of final goods or products (and, where applicable, the model number or type) to be produced, the due date by which each of the final products must be produced, and component tree configuration data which incorporates information relating to the number and type of components which are required to make a final product, illustrated in a tree and branch configuration which also includes information relating to the number and type sub-components required to manufacture each component. Production data stored at area 22 further includes assembly step data which specifies the specific machines which are required to manufacture various components as well as the final product, production rate data which specifies the amount of time required to make each component or final product which is to be produced in the production process, lot size data, which specifies the volume of each component or final product which can be produced in a single working operation run, the time (e.g., number of hours) required for each such working operation run, inventory data relating to the number of final products and/or components which have already been produced, and other relevant data relating to the production process.

As noted previously, any given manufacturing process includes a final downstream process or step, which involves the assembly of the final product to be manufactured, an initial upstream process or step in which certain sub-components or components are manufactured, and a plurality of intermediate processes or steps. Processes or steps are referred to herein as upstream or downstream with respect to the time at which they take place during an overall manufacturing process; and, therefore, other than the first and last steps, all steps can be considered both upstream and downstream. Applicants further note that other than the final downstream assembly step, all other steps can be considered upstream steps; and that other than the first and last steps in a process, each other step may be either upstream or downstream, dependent upon the step that it is being related to.

The process or step that can be planned by the first production plan generator 2 is generally considered a "downstream" process, and those processes which can be planned by the second production plan generator 3 are generally referred to as upstream processes in this specification, since the second generator uses the data from previous "downstream" processes that have been planned during a previous calibration or calculation. More particularly, first production plan generator 2 is utilized for generating "downstream process" data using "ultimate downstream process" data, with the second production plan generator 3 being repeatedly used to generate upstream process data using intermediate downstream process data, and so on. In this case, ultimate downstream process data is data input through input device 14, i.e., data relating to the production of the final product which is to be produced by the plan, with intermediate downstream process data being internally developed data, relating to the production plans for various production steps, which is prepared by the first production plan generator 2 or (later) by the second production plan generator 3.

An upstream process is a process which may be affected by, i.e., which will be limited to or restricted by, other production plan processes; thus, the upstream, processes can be determined only after the closest adjacent (in time) downstream process has been planned. When it is determined that a plurality of processes are ready to be planned by the first production plan generator 2 (e.g., when X and Y data are together received) or to be next planned by the second production plan generator 3, the production plans for these processes can be developed in any order. This could occur, e.g., with respect to process steps which occur at parallel levels within a production process, for which the specific order of performance is not critical.

Figure 4A:
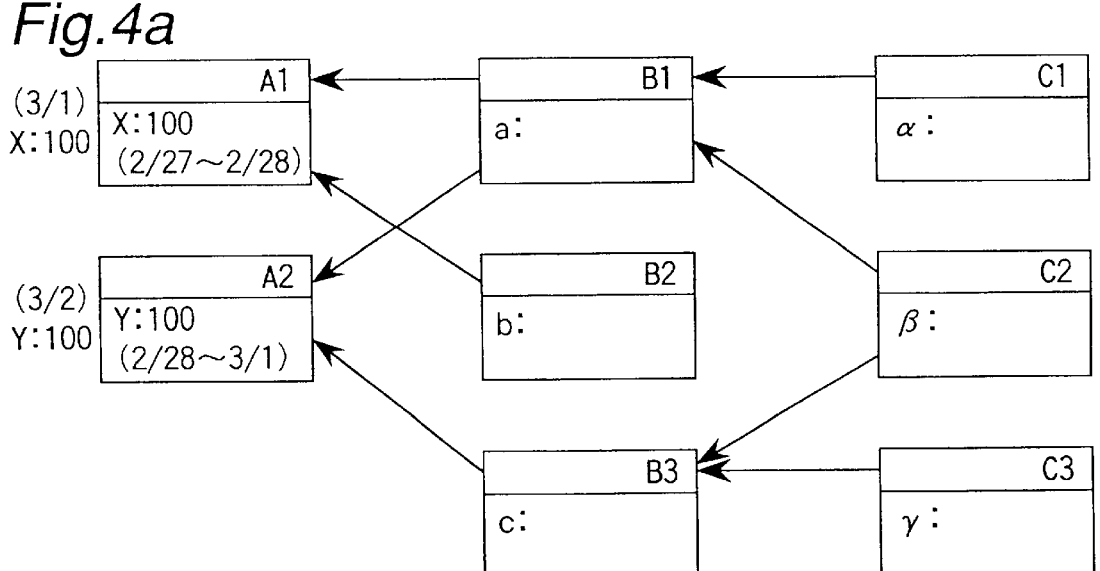
FIGS. 4a, 4b and 4c represent an example set of different plan levels of a process layout for producing final products, and schematically illustrate the various machinery and/or stations used in a production process.
Figure 4B:
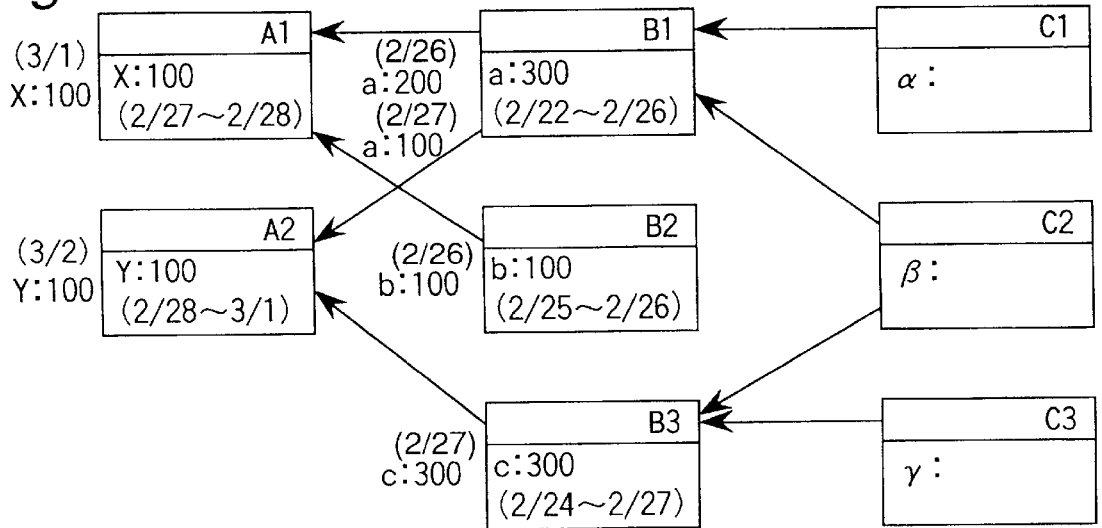
Figure 4C:
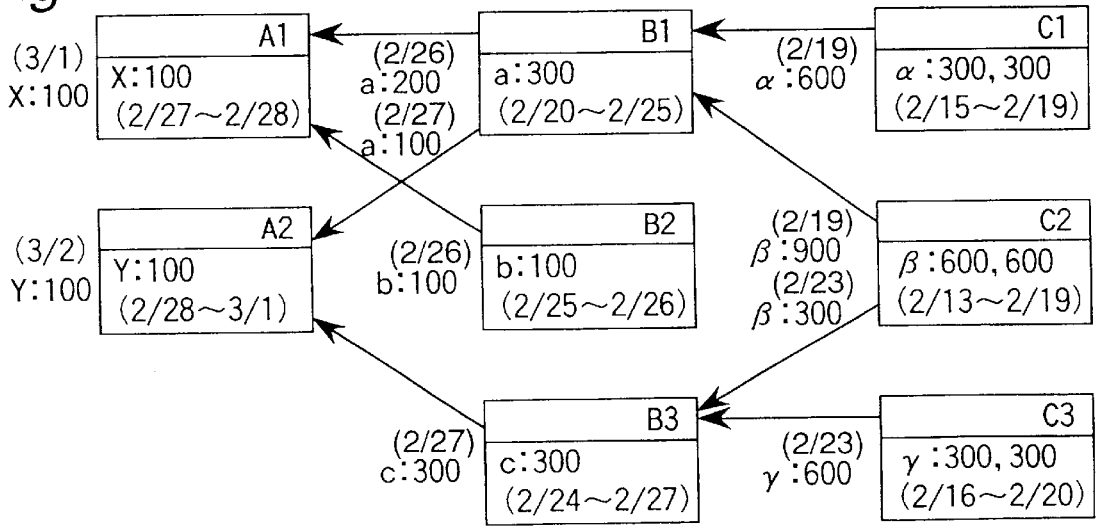
Figure 5A:
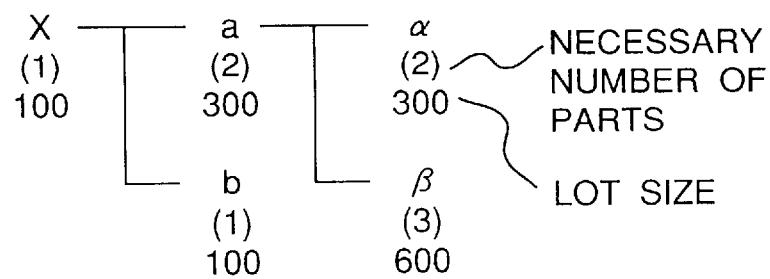
FIGS. 5a and 5b represent tree configuration data relating to the type and volume of components which are necessary to produce a given final product, and also indicate similar information regarding the sub-components which are necessary to form the components used to assemble the final product.

FIGS. 4a–4c represent three different planning levels used in generating a plan for producing 100 final products X and 100 final products Y, e.g., where X could comprise a 25" television and Y could comprise a 20" television. Alternately, X and Y could each be final products to later be assembled together. As shown in the far left hand portion of FIG. 4a, data input at 14 in FIG. 1 will show that one customer requires 100 of product X by March 1, with another customer requiring 100 of product Y by March 2. This data for products X and Y is input through input device 14 and is referred to as "ultimate downstream process" data, since it includes the customer date and quantity requirements for final products. The production data memory area 22 includes component tree configuration data (shown in FIGS. 5a and 5b, respectively) for the final product X and final product Y. This component tree information includes the number of final products which are required (e.g., 100 of X and 100 of Y), as well as showing the number of components and/or sub-components which are required to make each final product X and Y, respectively. In both of these figures, the numbers shown in parentheses show the number of parts necessary to make a single component or part represented by an immediate parent node on the tree. For example, a single final product X requires two components a and one component b; and to make each component a, two sub-components Á and three subcomponents Ã are required. Therefore, to make one final product X, sour Á and six Ã will be necessary. The numbers in each tree which are provided under the numbers in parentheses indicate the normal lot size for each component, i.e., the number of components which will be produced during a single working operation run. As shown in FIG. 5a, during one working operation run, 300 components "a" will be produced, even though only 200 are necessary to make the desired 100 final products X. The difference between these two numbers, i.e., 300−200=100, will later be stored as excess inventory and used in further process planning.

Figure 5B:
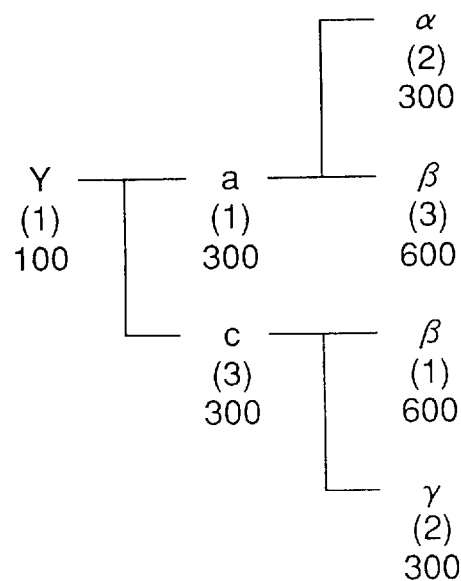
Figure 6:
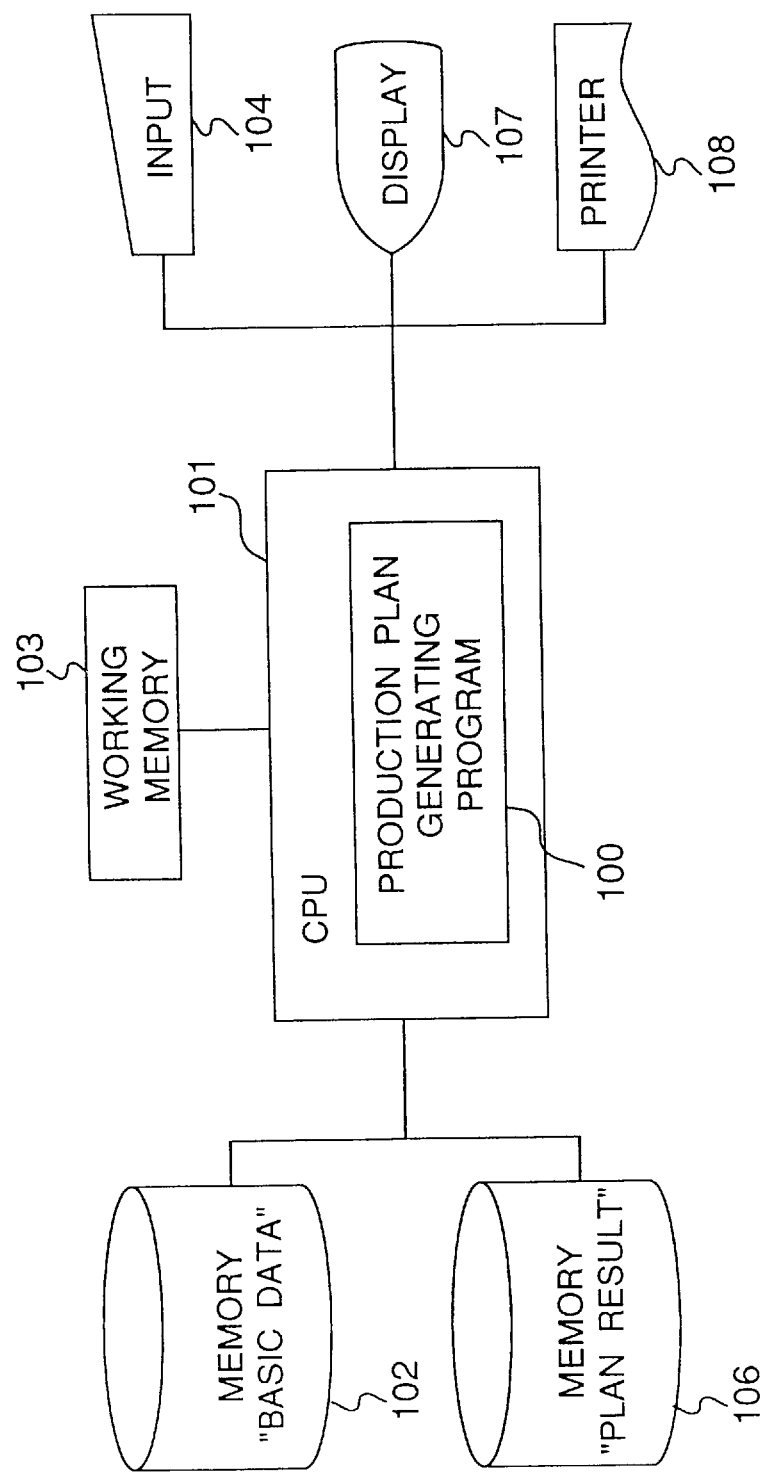
FIG. 6 is a block diagram of a known product plan generator assembly.

As shown in FIG. 5b, each product Y requires one component a and three components c, with each component c requiring one component Ã and two components γ, with each component "a" again requiring three β and two α.

As shown in FIG. 4a, the final products X and Y are assembled or produced by different stations or machines A1 and A2, respectively. The number of Final products X and Y which are required, and the dates (March 1 and March 2, respectively) are input as customer requirements (i.e., ultimate downstream process data) via input device 14. By using this input data, the dates then indicated in FIG. 4a, namely, the operation dates of February 27—February 28 for machine A1 and the operation dates of February 28—March 1 for machine A2 are calibrated/calculated by first production plan generator 2. Plan generating systems and subsystems which may be used to carry out the functions of the first production plan generator 2, as well as second production plan generator 3, are described in commonly assigned British Patent 2,219,109 (and its counterpart U.S. application), which has already been incorporated by reference herein in its entirety.

The production plan which is illustrated in FIG. 4a, and which is obtained by first production plan generator 2, is scored as a plan result in plan result data storage area 23. The data which is provided in FIG. 4a, relating to machines A1 and A2, will then be considered as intermediate downstream process data for calibrating the upstream process data relating to the other machines involved in the adjacent upstream processes, i.e., in the next step of the process, machines B1, B2 and B3 will be used, as described hereinafter. For purposes of facilitating the manner in which the present product plan generating system and method operate, only three levels of machines, namely, levels A, B and C, are illustrated. Each of the numbers A1–A2, B1–B3 and C1–C3 represent a different machine or station for producing different components or final products.

Figure 2:
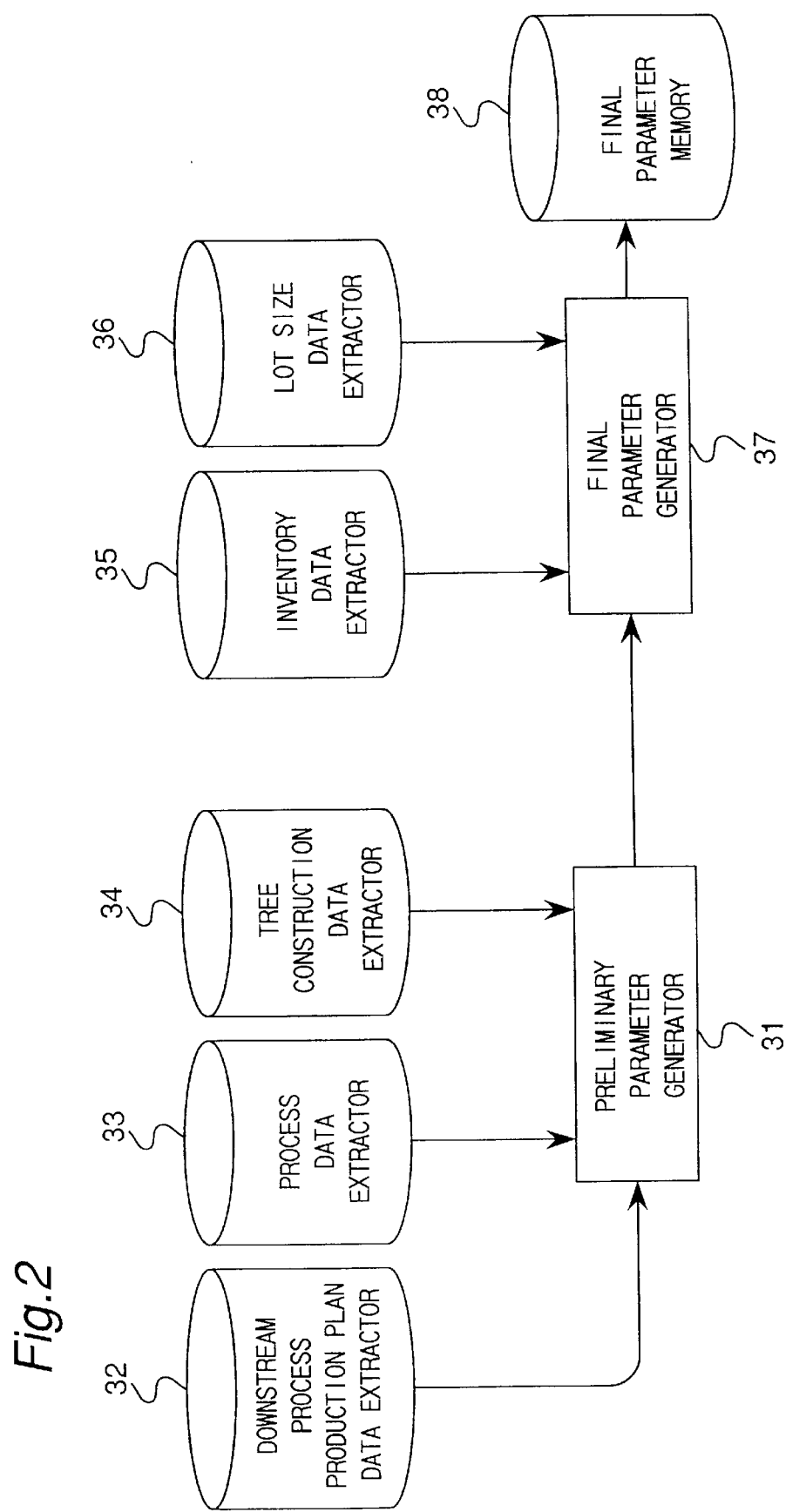
FIG. 2 is a schematic representation of a parameter generator which is adapted to obtain the final parameters for upstream processes in the production plan, based upon the production plans of downstream processes, as viewed in a chronological sequence of processes used in the overall manufacturing process for a given final product.

FIG. 2 illustrates the details of the parameter generator 4 which is used for determining a variety or parameters needed to plan the sequential upstream process(es), using data collected from data areas 21, 22 and 23, as shown in FIG. 1. Parameter generator 4 comprises a downstream process production plan data extractor 32 for extracting downstream process production plan data from the plan result data that was generated during a previous operation cycle, i.e., for a sequentially later (during production) downstream process; a component tree configuration data extractor 34 for extracting a portion of tree configuration data, examples of which are illustrated in both FIGS. 5a and 5b, from production data area 22, in order to obtain data indicative at the number and type of parts which will need to be produced in the upstream process(es); and a process data extractor 33 for extracting process data (e.g., time and/or production capability) related to machinery that is necessary for making products in the upstream process that occurs just prior to the downstream step for which downstream process data was extracted by extractor 32; and a preliminary parameter generator 31. Based upon the extracted downstream production plan data, the process/machinery data, and data which indicates the number of component parts to be produced in the next upstream process, preliminary parameter generator 31 will generate preliminary parameters, such as the part numbers of the parts that must be produced during the next upstream process(es) and the exact quantities of the corresponding parts that will need to be used to effect the production plans for the downstream processes which will occur later in the chronological, operational sequence of the manufacturing process.

Parameter generator 4 also comprises an inventory data extractor 35 for extracting inventory data with respect to any of the parts or components that must be produced in the upstream process, i.e., data relating to whether there is any inventory of any such parts, a lot size data extractor 36 for extracting data regarding the lot size in which components/parts that are to be manufactured in the various upstream processes are normally produced, a final parameter generator 37, and a final parameter memory 38. Based upon the amount of inventory available, i.e., the inventory data, and the lot size data, the preliminary parameters generated at 31 are revised to final parameters which give the actual quantity of each given part number or type that must be manufactured in any given upstream process. In other words, preliminary parameter generator 31 determines the volume of components which must be produced to satisfy the requirements of the generated downstream step or process plan, and the final parameter generator modifies these parameters by imposing practical limitations, resulting from lot size manufacture and inventory, upon such preliminary parameter(s). The final parameters are then stored in memory 38 and are used by second production plan generator 3 to generate schedules for manufacturing components during the various upstream processes or steps.

Figure 10:
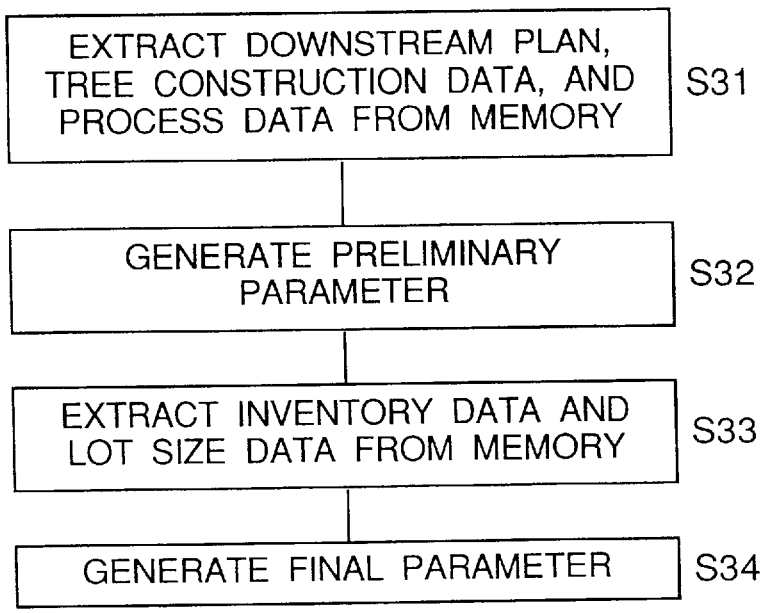
FIG. 10 is a flow chart representing the basic operations performed by a parameter generator which forms part of the present system.

Thus, in order to generate a parameter for use by the second product plan generator, FIG. 10 illustrates the basic steps performed by parameter generator 4. First, at step S31, downstream plan data, the appropriate tree construction data, and process/machinery data are extracted from memory, and at step S32, one or more preliminary parameters are generated which are based upon the production requirements imposed by the downstream process plan, the amount of time required as determined from the process data, and the number of components and/or sub-components required to be produced, as determined from the tree construction data. Thereafter, at step S33, inventory data and lot size data are extracted from memory 11, and one or more final parameters are generated which impose practical manufacturing limits upon the preliminary parameter(s) which were generated. More particularly, based upon the lot size which can be produced, less any excess inventory of a final product, component or sub-component which has been stored and retained in memory, a final parameter representing the number of components or sub-components which are to be produced is generated.

As a result, production plans for the various upstream processes are calculated/determined, based at least in part upon the requirements of the production plans previously generated for the previous downstream process(es). It is therefore possible to automatically and efficiently produce an overall appropriate production plan for interrelated upstream and downstream processes and steps, i.e., for planning the coordinated, efficient production of all required components, sub-components and final product(s).

Thus, parameter generator 4 serves to extract the appropriate data from memory 11, based upon the next level component to be manufactured (from the tree construction data) and the amount of time, e.g., that it takes to perform each process and transfer a product from one process to another (from the process data extractor 33), and information relating to the number of components or sub-components required, from downstream process production plan 32. Thus the preliminary parameter generator 31, based upon this information, determines what components need to be manufactured next, how much time it will take to transfer those components, and based upon the data provided from the adjacent (timewise) downstream process production plan which has been previously generated, and the tree construction data, the quantity of components which need to be made. This information is then sent to the final parameter generator 37, which modifies that information by reducing the number of components which need to be manufactured in view of any excess inventory which exists, and by then taking the lot size for each component into account, from lot size data extractor 36, in order to determine how many lots of each component must be made (which will likely increase the number of components to be produced). This data is stored in the final parameter memory 38, and is thereafter sent to second production plan generator 3.

The result of the operations which are performed by parameter generator 4 and by the second production plan generator 3 is illustrated in FIGS. 4b and 4c. As shown in FIG. 4b, based upon known data, i.e., based upon the intermediate (i.e., sequentially later) downstream process data determined with respect to machines A1 and A2, and the tree configuration data shown in FIGS. 5a and 5b, upstream process data relating to machines B1, B2 and B3 are determined. Particularly, the lot size, i.e., 300 pieces of part "a", can be produced by machine B1 if it operates from February 22 to February 26, in order to supply enough components (a) to machine A1 in time for it to begin its operation on the required date of February 27. Of the 300 pieces which are produced, 200 will be supplied to machine A1 by February 27, and 100 need to be supplied to machine A2 for the manufacture of final product Y, by February 28. It should be noted that it is coincidental that the 300 lot size for component (a) equals the total requirement of machines A1 and A2 in this example. For example, if the requirement of machine A2 had also been 200 (in which case 200 of final product Y would have been required), then it would have been necessary to manufacture 600 or component "a" (two lots of 300) in order to supply the 400 components (a) which would have been required in that case.

As can further be seen, one lot size (i.e., 100 pieces) of component "b" will be produced by machine B2, which will need to operate for two days, i.e., on February 25 and 26, in order to provide 100 components "b" to machine A1 in time for it to begin operation on February 27. Further, one lot size, i.e., 300 pieces of component "c", will be produced by machine B3, which will need to operate from February 24 through February 27 in order to supply 300 components "c" for the manufacture of 100 final products Y in a timely fashion, since machine A2 needs 300 components "c" on or before February 28. The production plan shown in FIG. 4b is generated by production plan generator 3 and is stored as a plan result in data storage area 23 of memory 11. The data which is illustrated in FIG. 4b, particularly as it relates to machines B1, B2 and B3, will then serve as the next intermediate downstream process data for calibrating and determining the next sequential upstream process data which relates to machines C1, C2 and C3, all as shown in FIG. 4c.

FIG. 4c illustrates the next step for calibrating upstream process data. In the present example, this is the last step of the final upstream data which will be calibrated; although for any given production process, there can be numerous additional such steps.

As shown in FIG. 4c, upstream process data relating to machines C1, C2 and C3 is determined and calibrated based upon known data, i.e., based upon the intermediate downstream process data plan which has already been generated with respect to machines B1, B2 and B3, and the tree configuration data shown in FIGS. 5a and 5b. As shown in this plan, 600 sub-components α (e.g., two for each component a) will need to be produced, as will 1200 subcomponents component β (900 for component a, or three for each such component a, and 300 for component c, or one for each component c), and 600 γ components will need to be made (in order to supply two for each component c). These determinations are made in a virtually identical fashion to the determinations which were made with respect to machines B1, B2 and B3.

For example, 600 sub-components a will have to be sent to machine B1 by February 20, and thus must be completed by February 19. Based upon the process data which is extracted by process data extractor 33, it will take a period of time between February 15–February 19 to manufacture a sufficient quantity of sub-components α to satisfy the requirement to make component "a" in sufficient quantity at machine B1, starting on February 20. Thus, 600 pieces (i.e., two lot sizes) of component or part α will be produced by machine C1, which will be operated from February 15–February 19, and all 600 pieces of component a will be supplied to machine a1 by February 20.

Furthermore, two lot sizes, i.e., 1200 pieces of sub-component β, will be produced by machine C2, which will need to be operated from February 13–February 19 to produce the same in time to supply machines B1 and B3 as required. Of those 1200 components β, 900 will need to be supplied to machine B1 for manufacture of 300 components "a" by February 19, and 300 will need to be supplied to machine B3 by February 23. Additionally, two lot sizes, i.e., 600 pieces of sub-component γ, will need to be produced by machine C3 in a time sufficient to supply them to machine B3 by February 23. Thus, 600 sub-components γ, will be produced by machine C3, which will need to be operated prom February 16–February 20, and all 600 pieces will be supplied to machine B3 by February 24.

The production plan which is illustrated in FIG. 4c was produced by second production plan generator 3, and is stored as a plan result in data storage area 23. The data which is shown in FIG. 4c, particularly with respect to machines C1, C2 and C3, thus serves as starting process data, e.g., as "ultimate" upstream data, which is required to produce 100 pieces of each of the final products X and Y by the customer required due dates of March 1 and March 2, respectively.

As is noted above, the first step in preparing an appropriate plan is to input the basic data 21 which relates to the production equipment being used, production data 22, i.e., process data which is specific to each process, and produced goods data, through input device 14. This input data can be referred to as data for "known conditions," and is stored by memory 11.

When CPU 1 is operated, processes/steps that can be planned based only upon data stored in basic data storage area 21 and production storage area 22 in memory 11 will first be determined by the first Production plan generator 2. This first plan generator then proceeds to generate production plans for the selected processes and stores the resulting pre-generated production plan data for all such steps as plan result data 23 in memory 11.

Second production plan generator 3 then determines which processes can be next planned based upon the data (i.e., basic data 21, production data 22 and plan result data 23) which is stored in memory 11, generates production plans for the next selected processes, and cumulatively stores the resulting pre-generated production plans in data storage area 23 of memory 11. The second production plan generator 3 repeats the process of plan determination-(i.e., (i.e., identifying the next step to be planned)-plan generation-data storage by following all of the process steps sequentially backwardly (i.e., in an order inverse to that in which they will be performed), for all remaining processes and steps, until production plans have been generated for all steps/processes, components, sub-components and final products which are required to produce the final product(s)

Figure 7A:
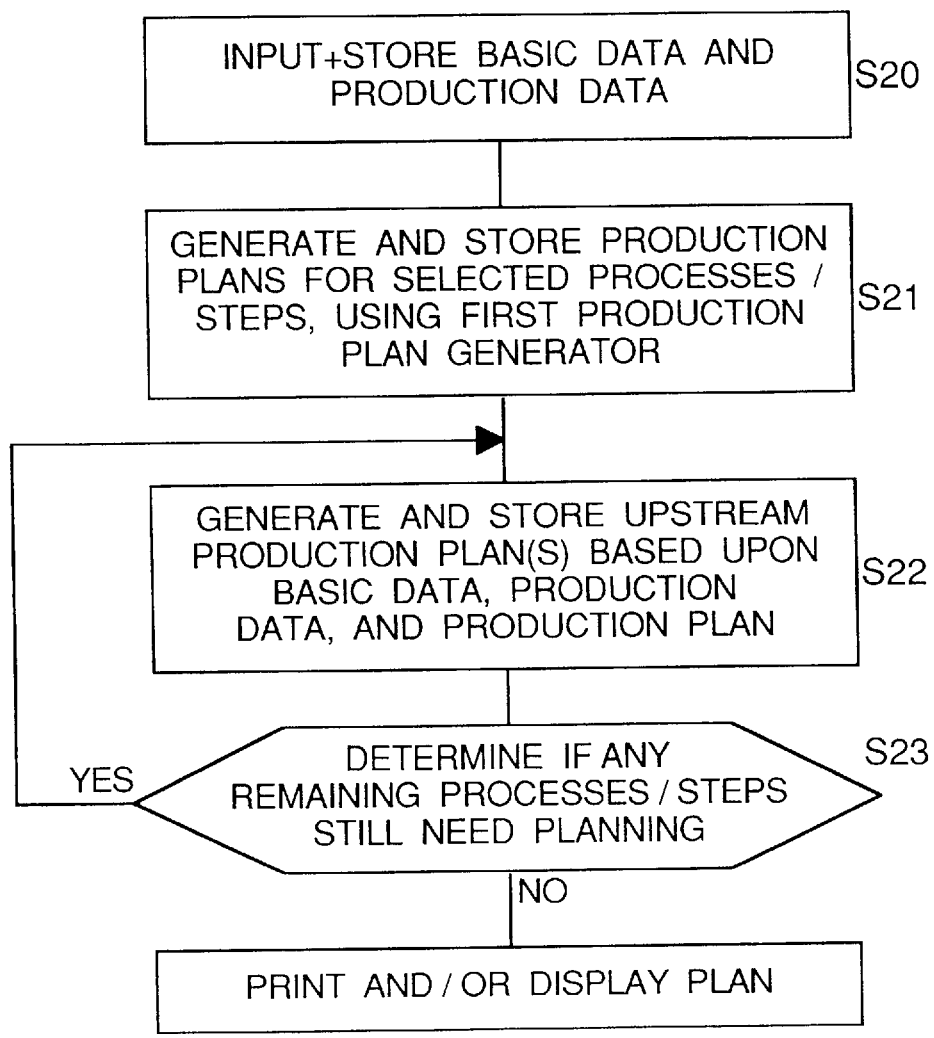
FIG. 7a is a flow chart representing several of the basic steps used to generate an overall production plan in accordance with the present invention.

This process is illustrated in FIG. 7a, which shows the first step (the input and storage of basic and production data at step S20), the generation and storage of the first level production plans by first production plan generator 2 at step S21, and the generation and storage of all subsequent levels of production plans by second production plan generator 3, at step S22. After second production plan generator 3 stores the plan for each downstream process, it is then determined, at step S23, whether there are any further components or sub-components for which plans need to be generated, and if additional plans need to be generated, then step S22 will again be executed. If no additional plans need to be generated, then the overall plan is printed by printer 13, or displayed on a terminal or other display device 12, or forwarded to an automated control facility. As a result, simply by inputting initially known data, production plans can be automatically generated, with priority given to those processes for which production plans can be generated based upon known conditions, irrespective of the chronological, spatial or other relationships between production processes; and thereafter, plans for all of the other required steps in the overall manufacturing process can be generated in a successive fashion.

Figure 7B:
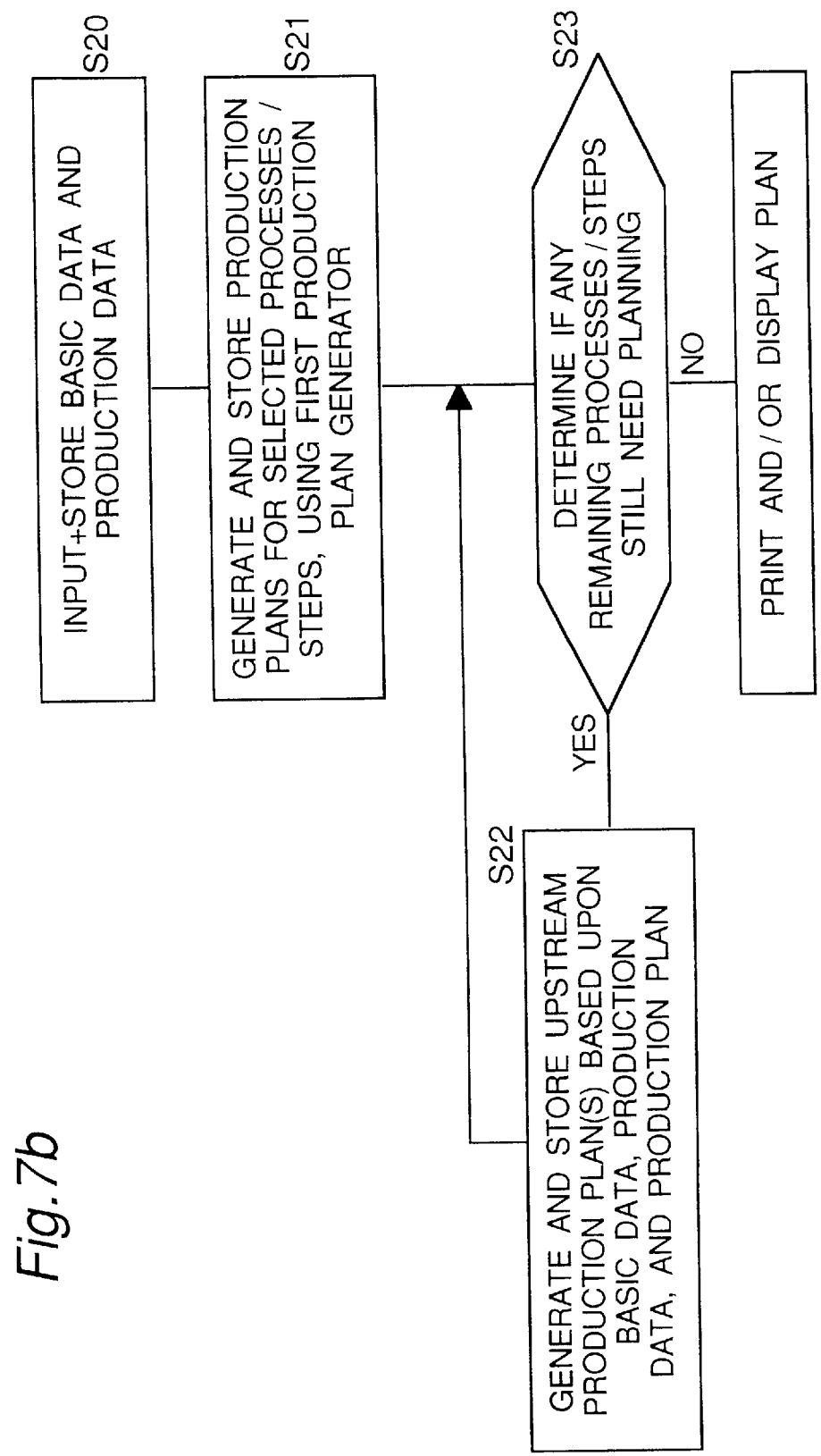

Instead of the flow operation shown in FIG. 7a, the flow operation shown in FIG. 7b can be used (and, at present, is a preferred method of implementing the present invention). The difference is that step S22 is shifted after "YES" selection of step S23.

Figure 3:
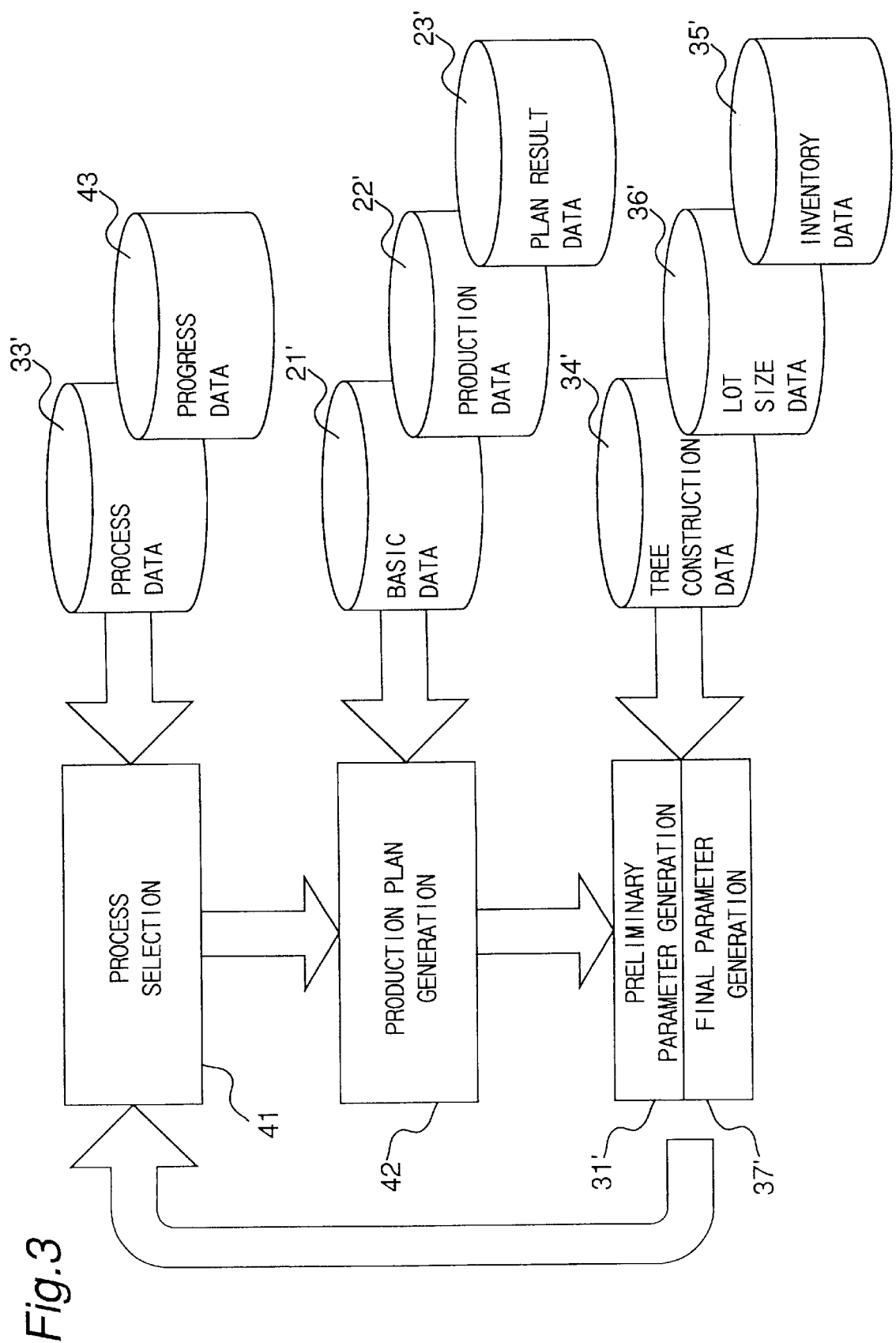
FIG. 3 is a flow chart representing a basic process for efficiently and sequentially processing production plans for a plurality of processes or steps used in a manufacturing process, as the number of known conditions increase.

FIG. 3 is a flow chart which represents a specific process for determining/identifying which processes can next be planned, using the pre-generated production plan data, in order to sequentially generate all production plans in an appropriate fashion. This process is executed by the second production plan generator 3, based upon the initially known data and the production plan data which is generated for the processes that are plannable based upon the initially known data, while generating final parameters for use in the planning of upstream processes.

As shown in FIG. 3, the completion status of production plans is monitored at process selection step 41, based upon the final parameters (which have taken process data 33' into consideration) stored in memory 38, which are obtained during preliminary parameter generation step 31', and final parameter generation step 37' shown in FIG. 3, and progress data 43, which tracks the completion of production plans for processes/steps that can be planned using only the process data and known data. This makes it possible to determine those processes for which production plans have not yet been generated, but which are no longer dependent upon another process for which a production plan has not yet been generated, i.e., it assists in determining those processes which are not then limited by, or dependent upon, any other process, and which thus could then be generated. All such processes are placed next on the queue for process selection 41.

In production plan generation process 42, the operation of second production plan generator 3 is carried out. More particularly, a production plan is generated for the preceding process (i.e., the next upstream process) selected by process selection 41, based upon basic data 21', production data 22', and plan result data 23'. If the process for which the production plan is determined is yet another upstream process for a downstream process, the preliminary parameter generation step 31' and the final parameter generation step 37' will be run based upon the most recently generated production plan. If no such further upstream process then exists, the procedure will move back directly to the process selection 41. This loop is then repeated as required until production plans have been developed for all processes.

The data which is extracted by the parameter generator 4 includes tree construction data 34', lot size data 36', inventory data 35' and process data 33'.

As a result, appropriate production plans for each process/step can be developed without error, and in appropriate order, based upon the known conditions at any point in time.

Figure 8:
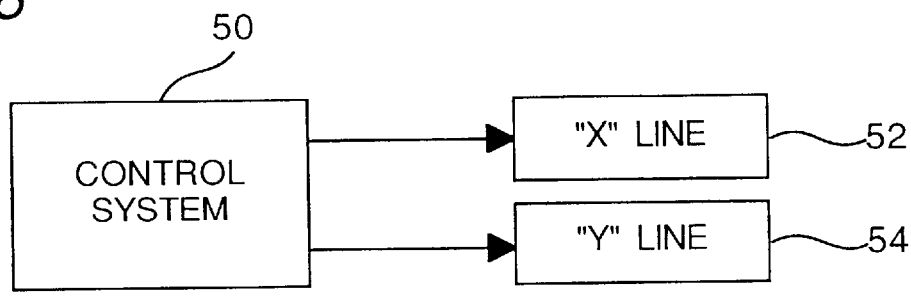
FIG. 8 is a block diagram of a control system used to control two assembly lines in accordance with a plan produced by the present system.
Figure 9A:
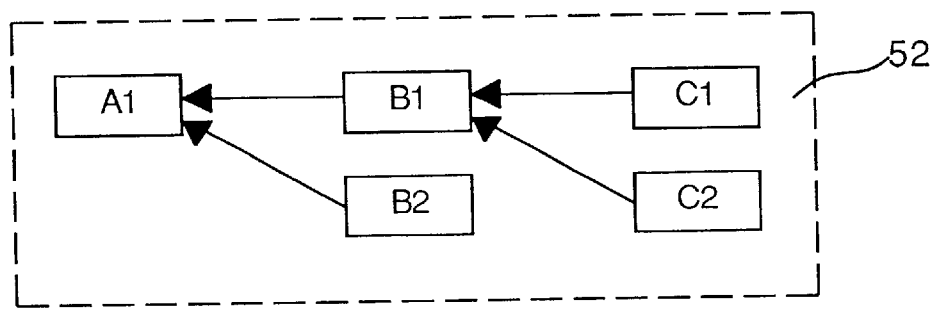
FIGS. 9a and 9b, respectively, schematically represent the machines used in two different assembly production lines for manufacturing finished products.
Figure 9B:
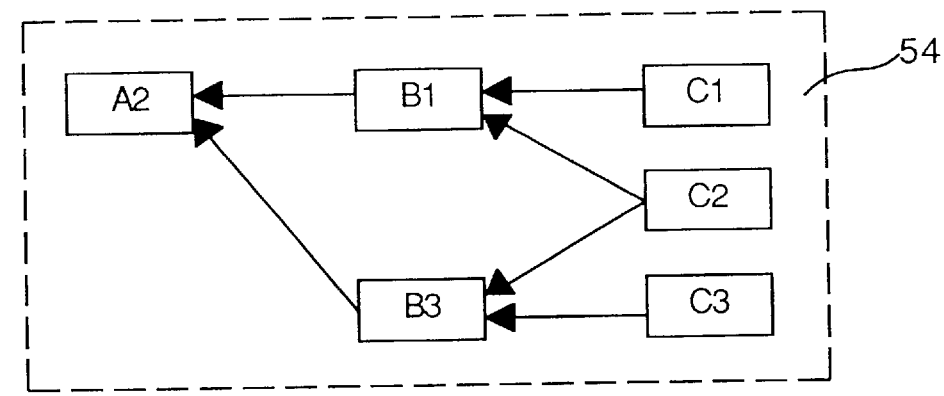

FIGS. 8, 9a and 9b are schematic representations of one way in which the overall plan which is generated, printed and displayed in FIG. 1 may be used to control the operation of a process for producing one or more final products. In FIG. 8, a control system 50 is shown which controls two different production lines, e.g., production line 52 for final product X (e.g., a 25" television) and production line 54 for final product Y (e.g., a 20" television). Although the exact manner of implementing the control of the production lines is not shown herein, it would be possible to implement a plan which is generated to control either or both of lines 52 and 54, either by controlling individual machines or stations in accordance with the overall plan generated, or by input into a central controller which then would control all such machines or stations.

The machines or (more likely) stations (each station comprising one machine or a plurality of machines) in each of the processes are illustrated schematically in FIGS. 9a and 9b and generally correspond to the stations/machines shown in FIGS. 4a–4c. More particularly, FIGS. 9a and 9b show machines/stations A1 and A2 which are required to assemble the final products X and Y, respectively, as part of respective assembly lines 52 and 54. The required machines/stations for final product X include machines B1 and B2, and machines C1 and C2 for producing and supplying sub-components to component station B1. For assembly line 54, the final product Y which is assembled at station/machine A2 receives components from stations/machines B1 and B3. Station B1, in turn, receives sub-components from stations C1 and C2, with station B3 receiving sub-components from stations C2 and C3. The apparatus and method of the present invention can thus be used with production lines having a plurality of stations with each station having individual machines or a plurality of machines.

By using the production plan generating method of the present invention as described above, it is possible to efficiently develop appropriate production plans for all processes because individual production plans will be generated in a coordinated fashion in sequential order, with priority given to generating plans for those processes for which production plans can be generated based upon known conditions at any point in time, and which do not depend upon the chronological, spatial or other relationship between production processes, thereby limiting the generation of production plans for remaining processes while gradually developing plans appropriate for all of the processes/steps of manufacturing components, sub-components and the final product(s).

Further, if production plans for downstream processes are generated first in a process in which there are a plurality of chronologically sequential processes, the parameters, including the product number, type and quantity of goods to be produced in the upstream processes, and when the processes are to be divided or combined, can then be generated based upon previously generated production plan data for the downstream processes, with the later generated production plans for upstream processes being generated to satisfy those parameters; and, in this fashion, an optimal production plan, which minimizes the time lag between chronologically sequential processes, can be generated for manufacturing processes which assemble components, manufactured in a plurality of upstream process steps, as a single product or part in a downstream process.

Further, by monitoring the progress of production plan completion for each process/step, and by identifying for next plan generation, those processes for which production plans have not yet been completed, and which can be generated without information from another process for which a production plan has not yet been generated, appropriate and complete production plans for each production step can be generated in accordance with known conditions at any given point in time without error and in appropriate sequence, efficiently and without (or with minimum) failure.

By using the production plan generator system in accordance with the present invention, a production plan for a plurality of processes or steps can be generated easily and within a relatively short period of time merely by inputting initially known data, since individual production plans can be generated with priority given to those processes for which production plans can be generated based upon known conditions, and which do not depend upon a chronological, spatial or other relationship between production processes in order to produce their respective plans. This will satisfy the conditions which limit generation of production plans for remaining processes while gradually developing plans which are appropriate for all such processes.

Having thus described the invention, it is apparent that there are other variations which are within the skill of one of ordinary skill in the art and which should not be regarded as a departure from the scope of the invention. Thus, all such modifications as would be within the skill of one of ordinary skill in the art are intended to be included within the scope of the claims which follow.

What is claimed is:

1. A production plan generating apparatus for generating a plurality of production plans for a plurality of different products, in sequential order, for producing a final product, in which said final product employs at least one component common to said plurality of different products, for a downstream process in which said final product is to be produced, and for a plurality of upstream processes which are used in forming said final product from a plurality of components, said production plan generating apparatus comprising:

an input device for inputting initial data including data relating to said downstream process in which said final product is to be produced;

a first memory for storing said initial data;

a first production plan generator for generating a first production plan including data relating to a first upstream process which needs to be performed in order to produce said final product, before said downstream process is performed, said first production plan generator generating said first production plan for said first upstream process, based upon at least some of said initial data and upon overall manufacturing process information;

a second memory for storing said first production plan;

a second production plan generator for generating a second production plan, that is stored in another memory distinct from the second memory, for a second of said upstream processes which needs to be performed in order to produce said final product, before said downstream process is performed, wherein said second production plan is generated based upon at least said first production plan stored in said second memory, and wherein said second upstream process is performed during the process of manufacturing said final product;

wherein said first production plan generator is provided for generating production plans which are independent of the requirements of any other processes or steps and which can therefore be generated before receiving information relating to any other processes or step; and wherein said second production plan generator is provided for generating production plans utilizing variable allocation rules which are dependent upon at least one other process or step and require information from at least one other production plan before generation of a second production plan, in order to determine a production schedule for producing said final product in accordance with an availability of said at least one component common to said plurality of different products.

2. A production plan generating apparatus in accordance with claim 1, wherein said second production plan generator comprises means for sequentially generating a production plan for each of an additional plurality of upstream processes, wherein each successive plan generated by said second production plan generator is based at least partially upon a production plan previously generated for a sequentially adjacent downstream process.

3. A production plan generating apparatus in accordance with claim 1, wherein said initial data includes basic data relating to the equipment required to produce said final product and all of said components, and production data specific to each component and process which is required to produce said final product.

4. A production plan generating apparatus in accordance with claim 1, further comprising a parameter generator for generating a plurality of process parameters for use by said second production plan generator in generating production plans for said second and said additional upstream processes.

5. A production plan generating apparatus in accordance with claim 4, wherein said parameter generator comprises a system for generating preliminary parameters, said preliminary parameters comprising the types of components which must be produced in a sequentially later process, and the exact quantity of said specific components which will need to be produced in said sequentially later process, and a system for generating final parameters which comprise the actual quantities of the specific components which must be produced during each of said second and additional upstream processes.

6. A production plan generating method for generating production plans in a chronologically sequential order for a plurality of different products, for a downstream process in which a final product, which employs at least one component common to said plurality of different products, is to be produced, and for a plurality of upstream processes which are required to form said final product from a plurality of components, said production plan generating method comprising:

inputting initial data including ultimate downstream process data which relates to the ultimate downstream process during which the final product is to be produced;

storing said input initial data;

generating first upstream process data based upon the initial input data and upon overall manufacturing process information, said upstream process data relating to one of said upstream processes which precedes production of said final product;

storing said first upstream process data in a memory; and generating additional upstream process data, which relates to an additional upstream process which needs to be performed in order to produce said final product, before a downstream process to finally produce the final product is performed, said additional upstream process data being based at least partially upon said first upstream process data, wherein said additional upstream process must be performed before said first upstream process is performed during production of said final product, the additional upstream process data being stored in another memory that is distinct from the memory storing the first upstream process data;

wherein said first upstream process data is generated independently of the requirements of any other upstream process data, and can therefore be generated before receiving information relating to any other upstream processes or steps; and wherein said additional upstream process data is generated utilizing variable allocation rules based upon at least one other process or step and requires data from at least one other process before generation of said additional upstream process data, in order to determine a production schedule for producing said final product in accordance with an availability of said at least one component common to said plurality of different products.

7. A production plan generating method in accordance with claim 6, further comprising repeating step (e), based upon the most recently generated additional upstream process data, until no further processes need to be performed in order to form said final product.

8. A system for generating an overall production plan for producing a plurality of different final products, wherein each final product is comprised of a plurality of components, in which at least one component is common to said plurality of different final products, said system being provided for generating a plan to determine the timing of a plurality of sequential process steps used to produce said plurality of final products, and the volume of final products and components which are to be produced, said system comprising:

a device for inputting data relating to the volume of each said final products required to be produced, and the date by which said required volume of each of said final products are required to be produced;

a memory for storing a data tree for each final product to be produced, said data tree comprising information regarding the number and types of components which are required to produce each said final product, including the number and types of components, common to said plurality of different final products, required to produce each said final product, for storing the sequence in which said process steps must be performed in order to produce each said final product, and for storing data relating to the time required to perform each of said sequential process steps; and a production plan generator apparatus for generating separate production plans for producing said final product and performing each of said steps, said overall production plan including the sequence in which said steps are to be performed and the volume of components which must be produced during each step, as well as the date by which each step must be performed in order to produce said final product in the required volume and by the required date;

wherein each of said final products is to be manufactured in accordance with a predetermined sequence, wherein said sequence involves a downstream process step in which the final product is assembled, and a plurality of sequential upstream steps in which the components which are required to manufacture said final product are assembled, wherein said production plan generator apparatus includes a first production plan generator and a second production plan generator, said first production plan generator comprising means for generating a plan for producing a final product in accordance with said downstream process step, based upon data input by said device for inputting data, and wherein said second production plan generator comprises means for generating a plan utilizing variable allocation rules for performing each of said upstream process steps in accordance with at least some of the data input by said device for inputting data, and in accordance with step data relating to an immediately preceding process step, which is required to produce said final product, so that a production schedule for producing each final product is produced in accordance with an availability of said at least one component common to said plurality of different final products.

9. A system in accordance with claim 8, wherein said device for inputting data comprises means for inputting data regarding a plurality of different final products.

10. A system in accordance with claim 9, wherein at least one of said plurality of different final products has at least one component which is required to be used to manufacture said at least one final product in common with a second one of said plurality of different final products.

11. A system in accordance with claim 8, wherein said production plan generator apparatus includes a parameter generator, said parameter generator including means for generating a preliminary parameter and means for generating a final parameter, said means for generating a preliminary parameter including means for extracting data regarding an immediately preceding downstream process production plan, process data, and tree construction data relating to the components of the final product to be produced, from said memory, said final parameter generator comprising means for extracting inventory data and component lot size manufacturing data from said memory.

12. A system in accordance with claim 8, wherein each of said production plan generators comprises means for generating a production plan for controlling a plurality of machines used in different process steps required to produce said final product.

13. A system in accordance with claim 8, further comprising means controlling production of said final products in accordance with said overall production plan generated by said system.

14. A system in accordance with claim 8, said system including a printer for printing each production plan which is generated by said system, and a display device for displaying each production plan which is generated by said system.

15. A system in accordance with claim 8, wherein said memory comprises a RAM.

16. A system in accordance with claim 8, further comprising means for controlling production of each final product in accordance with said overall production plan generated by said system.

17. A method of generating an overall production plan for producing a plurality of different final products each comprised of a plurality of components, in which at least one component is common to the plurality of different final products, said overall production plan governing the production of said components and said plurality of different final products in a production process including a plurality of sequential process steps, said sequential process steps including a downstream production process step which produces said final products, and a plurality of upstream production process steps for producing said components, said method comprising:

inputting and storing basic data relating to said production process and production data regarding the volume of said plurality of different final products required to be produced, and the date by which said required volume of the plurality of different final products is required to be produced;

generating and storing a first production plan for producing said final products in said downstream production process step, said first production plan being based upon at least some of said basic data and said production data, the first production plan being stored in a memory;

generating and storing a second production plan for a first upstream process step preceding said downstream process step utilizing variable allocation rules, and which needs to be performed in order to produce said final products, said second production plan being based upon at least some of said basic data, said production data and said first production plan, said second production plan being stored in another memory distinct from said memory;

determining whether any additional upstream processes require planning; and if any additional upstream processes are determined as requiring planning, generating and storing an additional production plan for an additional upstream process step which has not yet been planned and which must be performed before a next previously planned process step is performed during manufacture of said final products, based upon at least some of said basic data, said production data, and the next previous production plan;

wherein said first production plan is generated independently of the requirements of any other processes or steps, and can therefore be generated before receiving information relating to any other processes or step;

wherein said second production plan is generated dependently upon at least one other process or step and requires information from at least one other production plan before generation of said second production plan; and wherein said additional production plan is generated dependently upon at least one subsequently executable process or step and requires information from at least one other previously generated production plan before generation of said additional production plan, so that a production schedule for producing the plurality of different final products is determined in accordance with an availability of the at least one common component.

18. A method in accordance with claim 17, further comprising generating and storing overall production plans for a plurality of final products.

19. A method in accordance with claim 18, wherein at least two of said final products to be produced have at least one component in common.

20. A method in accordance with claim 17, further comprising printing said overall production plan.

21. A method in accordance with claim 17, further comprising displaying said overall production plan.

22. A method in accordance with claim 17, further comprising repeatedly determining whether any required upstream process steps still require planning.

23. A method in accordance with claim 22, further comprising generating a production plan for the next sequential upstream process step to be performed in producing said final product, each time that any upstream process steps are determined to still require planning.

24. A method in accordance with claim 23, further comprising generating a final parameter relating to the volume and type of components which must be produced in the next process step to be planned, prior to the generation of each of said upstream production plans.

25. A method in accordance with claim 24, further comprising producing said final parameter by extracting from a memory production plan data for a sequentially preceding plan, construction tree data relating to the component which must be next produced, and process specific data, generating a preliminary parameter, and modifying the preliminary parameter in order to generate a final parameter, after extracting inventory data and component lot size from a memory.

26. A method in accordance with claim 17, further comprising controlling the production of each said final product and each of said components in accordance with said overall production plan.

* * * * *

UNITED STATES PATENT AND TRADEMARK OFFICE
CERTIFICATE OF CORRECTION

PATENT NO. : 5,841,659
DATED : November 24, 1998
INVENTOR(S) : M. TANAKA et al.

It is certified that error appears in the above-identified patent and that said Letters Patent is hereby corrected as shown below:

On the cover page of the printed patent at item [56], References Cited U.S. Patent Documents, "5,321,692" should be --5,321,620.

Signed and Sealed this

Fifteenth Day of February, 2000

*Attest:*

Q. TODD DICKINSON

*Attesting Officer*   Commissioner of Patents and Trademarks